Nov. 3, 1925.

A. D. PURTLE ET AL

RADIUS ROD

Filed Oct. 24, 1923

A. D. Purtle AND
D. C. Farra   Inventor

By C. A. Snow & Co.

Attorneys

Patented Nov. 3, 1925.

1,559,985

UNITED STATES PATENT OFFICE.

ALBERT D. PURTLE AND DELMAR C. FARRA, OF MARIETTA, OHIO.

RADIUS ROD.

Application filed October 24, 1923. Serial No. 670,551.

*To all whom it may concern:*

Be it known that we, ALBERT D. PURTLE and DELMAR C. FARRA, citizens of the United States, residing at Marietta, in the county of Washington and State of Ohio, have invented a new and useful Radius Rod, of which the following is a specification.

This invention relates to radius rods for motor vehicles and more particularly to a novel form of yoke for connecting the forward ends of the radius rods to the axle of the vehicle.

An important object of the invention is to provide a yoke which will not only permit of slight movement of the radius rods with respect to the front axle, but will raise the usual perch irons to increase the space between the upper edge of the axle and ends of the spring allowing free movement of the spring with respect to the perch irons.

Another object of the invention is to provide means for restricting lateral movement of the radius rods with respect to the yokes connecting the radius rods to the axle of the motor vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
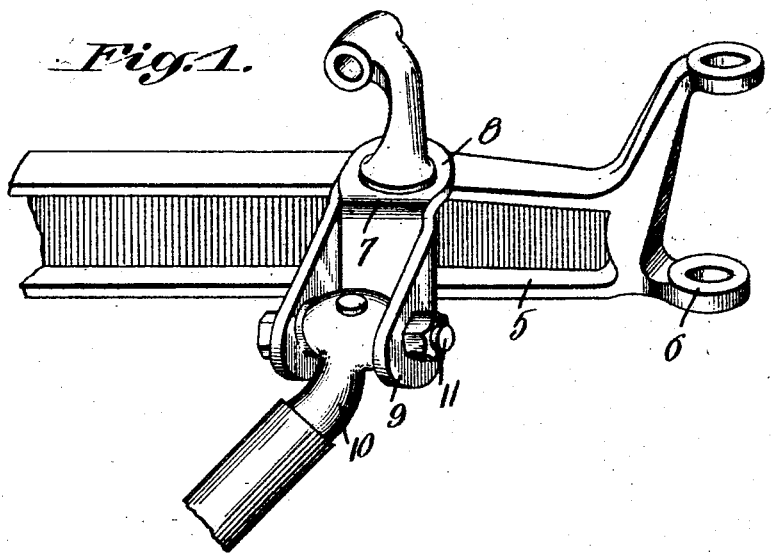
Figure 1 is a fragmental perspective view disclosing one of the radius rods of a motor vehicle as connected to the front axle by a yoke constructed in accordance with the invention.
Figure 2:
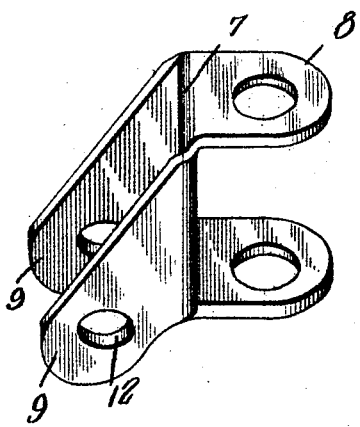
Figure 2 is a perspective view of the yoke.
Figure 3:
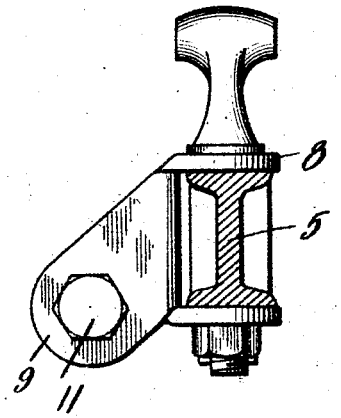
Figure 3 is a side elevational view of the yoke as applied, the axle being shown in section.

Referring to the drawing in detail, the reference character 5 designates the axle of a motor vehicle, which is supplied with the usual spindle axle bearings 6 in which the front axle of the vehicle are mounted.

The yoke forming the subject matter of the invention is indicated generally by the reference character 7 and is preferably stamped from sheet metal to provide inwardly extended spaced ears 8 which are formed with openings to receive the shanks of the usual perch irons employed in motor vehicle construction. Thus it will be seen that due to this construction, one of the ears 8 will rest on the upper surface of the front axle, while the opposite ear will engage the under surface, whereupon the connection between the radius rods and front axle will be exceptionally rigid insuring against the axle 5 twisting with respect to the radius rods.

Forming a part of the yoke are rearwardly and downwardly extended ears 9 formed laterally of the body portion of the yoke, the space between the ears 9 being slightly greater than the width of the head 10 of the radius rod associated therewith.

The head 10 of the radius rod is of the usual construction and is formed with an opening to accommodate the bolt 11 which passes through openings 12 in the ears 9 to secure the radius rod to the yoke as clearly shown by Figure 1 of the drawing. From the foregoing it will be obvious that slight pivotal movement of the head 10 of a radius rod will be permitted with respect to the yoke and axle supporting the same, compensating for vibrations and insuring against the connection between the radius rods and front axle bending to render the connection useless.

We claim:—

In a device of the character described, a body portion, said body portion including forwardly extended spaced ears extending from the upper and lower edges thereof said body portion adapted to closely engage the side face of an axle, inwardly and downwardly extended spaced ears extending from the side edges of the body portion, the ears being formed with openings to receive securing bolts, and said last mentioned ears being relatively wide to provide supporting flanges to hold the forward end of a radius rod against twisting.

In testimony that we claim the foregoing as our own, we have hereto affixed our signatures.

ALBERT D. PURTLE.
DELMAR C. FARRA.